Patented June 6, 1939

2,161,339

UNITED STATES PATENT OFFICE 2,161,339

CYANINE DYE

Walter Dieterle, Dessau-Ziebigk in Anhalt, and Robert Walter, Wolfen, Kreis Bitterfeld, Germany, and Hermann Dürr, Binghamton, N. Y., assignors, by mesne assignments, to Agfa Ansco Corporation, Binghamton, N. Y., a corporation of Delaware No Drawing. Application December 2, 1933, Serial No. 700,750. In Germany January 13, 1931

11 Claims. (Cl. 260—240)

Our present invention relates to selenopseudocyanines. It is a continuation-in-part of our co-pending application Ser. No. 586,056 filed Jan. 11, 1932.

One of its objects is a process of manufacturing selenopseudocyanines. Another object are the selenopseudocyanines. Further objects will be seen from the detailed specification following hereafter.

We have found that selenopseudocyanines of the general formula:

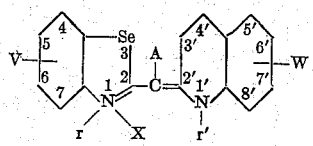

V and W=H, alkyl, alkoxy, substituted amino groups, benzene, halide,
r and r'=alkyl,
A=H, alkyl,
X=halide, perchlorate, para-toluene sulfonate, alkylosulfate, nitrate, or another suitable anion, can be easily prepared by acting on the quaternary salt of a suitable selenazole base with the quaternary salt of a 2-iodoquinoline in the presence of alkali.

The selenopseudocyanines are particularly suitable for the sensitizing of emulsion layers for producing part-color pictures, since, as compared with the known sensitizers, they have a better selection capacity for the same spectral region.

In the general formula V and W may take any position in the benzene nuclei, however, the 5 and 6 position and the 6' and 7' position are preferred. V and W may represent alkyl, for instance, methyl, ethyl, etc., or an alkoxy group, for instance, a methoxy or ethoxy group, or an amino group both hydrogen atoms of which are replaced by alkyl or one of the hydrogen atoms being replaced by alkyl and the other by aryl and finally one of the hydrogen atoms being replaced by an acyl radical, or halide, or benzene. r and r' may be alkyl, for example methyl, ethyl, propyl, etc. A may represent H, methyl or ethyl. X can be any suitable anion that will precipitate the dye, for instance, a halide, paratoluene sulfonate, alkylosulfate, perchlorate, nitrate, or the like.

The dyes are obtainable according to the desired solubility in form of the bromide, iodide, perchlorate, etc. The anion of the dye can be easily exchanged. If the anion to be introduced into the molecule yields a dye which is less soluble than that containing the anion to be replaced, the dye can be obtained by interaction of the latter dye with an easily soluble salt of the anion to be introduced, for instance, the sodium salt of the said anion. If the anion to be introduced into the molecule yields a dye of increased solubility, there is used a salt of the anion with a cation which forms an insoluble salt with the anion to be replaced. For this purpose the silver salt of the anion to be introduced will in most cases be suitable, since in the manufacture of the selenopseudocyanine dyes from the ethiodides of the parent bases, the dye will usually be precipitated in the form of a halide, generally the iodide.

The following examples serve to illustrate our invention.

*Example 1.*—For producing the dye 1.1'-diethyl-2.2'-(benzselenoquino)-cyanine-iodide corresponding to the formula

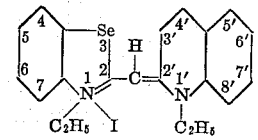

7 grams of 2-methylbenzselenazole-ethyl-iodide are boiled with 8 grams of 2-iodo-quinoline-ethyl-iodide and 100 cc. of alcohol. To the reaction mixture there are added 20 cc. of an alcoholic solution of caustic potassium of 4 per cent strength while heating is continued for about 10 minutes. The dye precipitates when cooling the orange red solution.

The alcoholic solution of the dye shows an absorption maximum at a wave length of about 490 $\mu\mu$.

*Example 2.*—For producing the dye 1-methyl-1'-ethyl-2.2'-(benzselenoquino)-mesomethyl-cyanine-iodide corresponding to the formula 7 grams of 2-ethyl-benzselenazole-methyl-iodide and 8 grams of 2-iodo-quinoline-ethyl-iodide in 100 grams of boiling alcohol are mixed with 20 cc. of an alcoholic solution of caustic potassium of 4 per cent strength. After cooling the dye precipitates in form of orange colored needles.

The alcoholic solution of the dye shows an absorption maximum at a wave length of about 490 $\mu\mu$.

*Example 3.*—For producing the dye 1.1'-diethyl-2.2'-(benzseleno-6'-methylquino)-cyanine-iodide corresponding to the formula

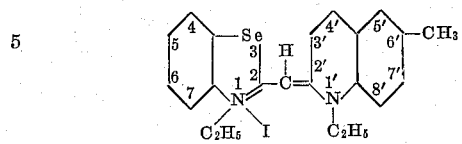

to the boiling solution of 7 grams of 2-methyl-benzselenazole-ethyl-iodide and 8.5 grams of 2-iodo-p-toluquino-ethyl-iodide in 100 cc. of alcohol, there are gradually added 20 cc. of an alcoholic solution of caustic potassium of 4 per cent strength. The dye is precipitated by cooling. It crystallizes from alcohol in form of orange colored little rods.

The alcoholic solution of the dye shows an absorption maximum at a wave length of about 495 $\mu\mu$.

*Example 4.*—For producing the dye 1.1'-diethyl - 2.2' - (benzseleno - 5',6' - benzo - quino) - cyanine-iodide corresponding to the formula

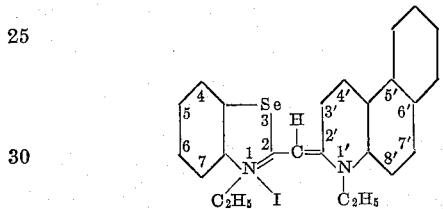

a mixture of 7 grams of 2-methyl-benzselenazole-ethyl-iodide and 9 grams of 2-iodo-$\beta$-naphthoquino-ethyl-iodide are boiled with 100 cc. of alcohol and then 20 cc. of an alcoholic solution of caustic potassium of 4 per cent strength are gradually added, whereby the dye separates in form of dark orange red crystals.

The alcoholic solution of the dye shows an absorption maximum at a wave length of about 510 $\mu\mu$.

*Example 5.*—For producing the dye 1.1'-diethyl-2.2'-(6-methoxy-benzseleno - 6' - methoxy-quino)-cyanine-iodide corresponding to the formula

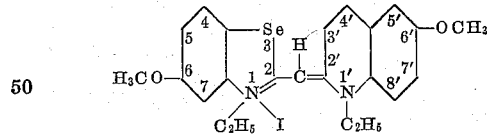

4 grams of 5-methoxy-2-methyl-benzselenazole-ethyl-iodide are boiled with 4.5 grams of 6-methoxy-2-iodo-quinoline-ethyl-iodide in 100 cc. of alcohol. After adding 10 cc. of an alcoholic solution of caustic potassium of 4 per cent strength and cooling the dye separates in form of orange red crystals.

The alcoholic solution of the dye shows an absorption maximum at a wave length of about 510 $\mu\mu$.

*Example 6.*—For producing the dye 1.1'-diethyl-2.2'-(6-methyl - benzseleno - 8' - methoxy-quino)-cyanine-iodide corresponding to the formula

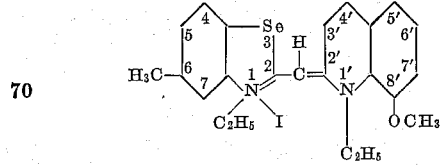

4 grams of 2.5-dimethyl-benzselenazole-ethyl-iodide and 4.5 grams of 8-methoxy-2-iodo-quinoline-ethyliodide are dissolved in hot alcohol. The solution is boiled and is while boiling mixed with 10 cc. of an alcoholic solution of caustic potassium of 4 per cent strength. While cooling the dye precipitates in form of orange red crystals.

The alcoholic solution of the dye shows an absorption maximum at a wave length of about 500 $\mu\mu$.

*Example 7.*—For producing the dye 1-methyl-1'-ethyl-2.2' - (5 - iodo - benzseleno - 6' - methylquino)-cyanine-iodide corresponding to the formula

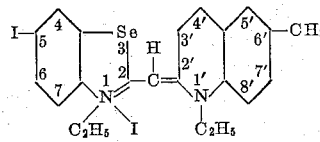

4.5 grams of 6-iodine-2-methyl-benzselenazole-ethyl-iodide and 4 grams of 2-iodo-p-tolu-quinoline-ethyl-iodide are dissolved in 100 cc. of hot alcohol. The boiling solution is mixed with 10 cc. of an alcoholic solution of caustic potassium of 4 per cent strength and heating is continued for 10 minutes. After cooling the dye separates in form of orange red crystals.

The alcoholic solution of the dye shows an absorption maximum at a wave length of about 495 $\mu\mu$.

*Example 8.*—For the production of the dye 1.1'-diethyl-2.2'-(6.6' - diethoxy - benzseleno - quino)-cyanine-iodide corresponding to the formula

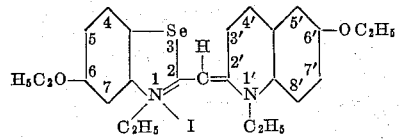

4.5 grams of 5-ethoxy-2-methyl-benzselenazole-ethyl-iodide and 4 grams of 6-ethoxy-2-iodo-quino-ethyl-iodide are heated with 100 cc. of alcohol until boiling and then mixed with 10 cc. of an alcoholic solution of caustic potassium of 4 per cent strength and kept boiling for about 10 minutes. The dye separates in form of reddish little rods.

The alcoholic solution of the dye shows an absorption maximum at a wave length of about 510 $\mu\mu$.

*Example 9.*—For producing the dye 1-methyl-1'-ethyl-2.2'-(4.5-benzo-benzseleno - 6' - methylquino)-cyanine-chloride corresponding to the formula we operate as follows: 3.5 grams of 2-methyl-naphthoselenazole-ethyl-iodide and 4 grams of 2-iodo-p-tolu-quinoline-ethyl-iodide are boiled with 100 cc. of alcohol and then mixed with 10 cc. of an alcoholic solution of caustic potassium of 4 per cent strength, while boiling is continued for a short time. The separating dye is filtered and dissolved in concentrated hydrochloric acid. To this solution there are first added a concentrated solution of sodium chloride and then a concentrated aqueous solution of ammonia by which operation the dye is precipitated in form of large orange red flakes.

The alcoholic solution of the dye shows an absorption maximum at a wave length of about 505 μμ.

*Example 10.*—For producing the dye 1.1'-diethyl-2.2'-(6-chloro-benzseleno-7'-methylquino)-cyanine-iodide corresponding to the formula

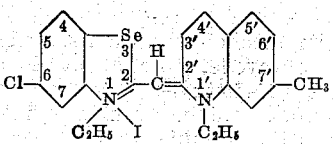

3.5 grams of 5-chloro-2-methyl-benzselenazole-ethyl-iodide and 4 grams of 2-iodo-7-methyl-quino-ethyl-iodide are boiled with 100 cc. of alcohol and to the boiling mixture there are added 10 cc. of an alcoholic solution of caustic potassium of 4 per cent strength. While cooling the reaction mixture the dye separates. It crystallizes from its alcoholic solution in form of small felted crystals.

The alcoholic solution of the dye shows an absorption maximum at a wave length of about 490 μμ.

*Example 11.*—The 1-methyl-1'-ethyl-5-aminoselenopseudocyanine iodide corresponding with the formula

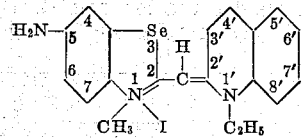

may be made by boiling 2 grams of 6-amino-2-methyl-benzselenazole methiodide and 2 grams of 2-iodoquinoline ethiodide in 20 cc. of alcohol and adding 5 cc. of an alcoholic solution of sodium ethylate of 3 per cent strength. On cooling, the dye separates in the form of dark brown-red flakes.

By recrystallization from alcohol the dye can be obtained in the form of small brown-red crystals.

The alcoholic solution of the dye has an indefinite absorption maximum at a wave length of about 520 μμ.

*Example 12.*—The dye 1-methyl-1'-ethyl-5-propionylamino-6'-methyl-selenopseudocyanine iodide corresponding with the formula

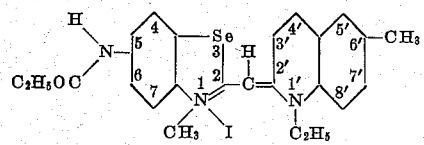

may be obtained by dissolving 2 grams of 6-propionyl-amino-2-methyl-benzselenazole methiodide and 2 grams of 2-iodo-6-methylquinoline ethiodide in 20 cc. of boiling alcohol and adding to the boiling solution 4 cc. of an alcoholic solution of sodium ethylate of 3 per cent. strength. The mixture assumes a red color. The dye separates in the form of orange flakes after cooling. Recrystallization from alcohol yields orange-red felted needles.

The alcoholic solution of the dye has an absorption maximum at a wave length of about 505 μμ.

*Example 13.*—The dye 1-methyl-1'-ethyl-5-butyrylamino-6'-methyl-selenopseudocyanine iodide corresponding with the formula

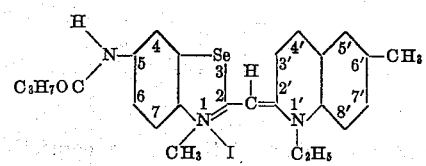

may be obtained from 6-butyrylamino-2-methyl-benzselenazole methiodide and 2-iodo-6-methyl-quinoline ethiodide in a manner analogous to that described in Example 2.

The alcoholic solution of the dye has an absorption maximum at a wave length of about 505 μμ.

It is to be understood that our invention is not limited to the foregoing examples nor to the specific details given therein. Numerous other embodiments are possible and we contemplate as included within our invention all such modifications and equivalents as fall within the scope of the appended claims. So, for instance, the benzene nuclei may contain one or more substituents. The nomenclature used is arbitrary, but it is familiar to every chemist skilled in the art and has the advantage of clearness. Numbering of the bases is commenced from the selenium atom of the heterocyclic ring and numbering of the dyes is commenced from the nitrogen atom of the heterocyclic ring. The formulae of the dyes as given herein represent the molecular structure of our new dyes so far as known.

What we claim is:

1. The process of producing a selenopseudocyanine which comprises acting on a quaternary salt of a 2-ethylbenzselenazole with a quaternary salt of a 2-iodoquinoline in the presence of alkali.

2. The process of producing a selenopseudocyanine which comprises boiling 2-ethylbenzselenazole ethiodide with a quaternary salt of a 2-iodoquinoline in alcoholic solution in the presence of caustic potassium.

3. A 1.1'-dialkylbenzseleno-pseudocyanine salt.

4. A selenopseudocyanine corresponding with the formula

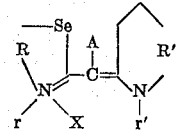

R being a member of the group consisting of naphthylene and

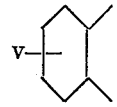

R' being a member of the group consisting of naphthylene and

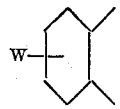

V and W being members of the group consisting of H, alkyl, alkoxy, amino groups, an amino group substituted by the radical of a lower fatty acid and halogen, r and r' being alkyl, A being a radical selected from the group consisting of H and alkyl, and X being an anion capable of precipitating the dye.

5. A selenopseudocyanine corresponding with the formula

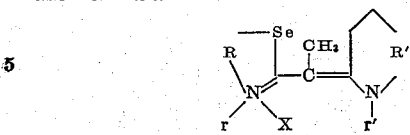

R being a member of the group consisting of naphthylene and

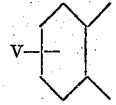

R' being a member of the group consisting of naphthylene and

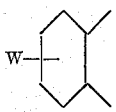

V and W being members of the group consisting of H, alkyl, alkoxy, amino groups, an amino group substituted by the radical of a lower fatty acid and halogen,
r and r' being alkyl,
X being an anion capable of precipitating the dye.

6. The dye 1.1'-diethyl-2.2'-(benzseleno-quino)-cyanine-iodide corresponding with the formula

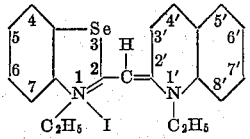

having in its alcoholic solution an absorption maximum at a wave length of about 490 μμ.

7. The dye 1.1'-diethyl-2.2'-(benzseleno-5'.6'-benz-quino)-cyanine-iodide corresponding with the formula

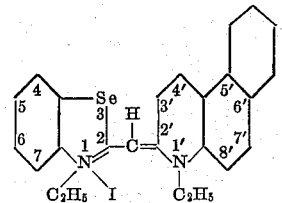

having in its alcoholic solution an absorption maximum at a wave length of about 510 μμ.

8. The dye 1.1'-diethyl-2.2'-(6-methoxy-benzseleno-6'-methoxy-quino)-cyanine-iodide corresponding with the formula

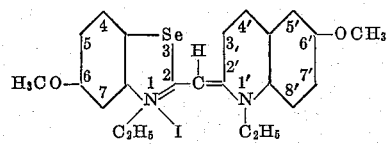

having in its alcoholic solution an absorption maximum at a wave length of about 510 μμ.

9. The process of producing a selenopseudocyanine which comprises acting on a quaternary salt of a 2-ethyl benzselenazole with a quaternary salt of a 2-iodo-quinoline in the presence of a strong base.

10. An [N-alkyl-benzselenazole (2)]-[N-alkyl-quinoline (2)]-methinecyanine salt.

11. An [N-alkyl-benzselenazole (2)]-[N-alkyl-quinoline (2)]-meso-methyl-methinecyanine salt.

WALTER DIETERLE.
ROBERT WALTER.
HERMANN DÜRR.